United States Patent [19]
Preist

[11] 3,763,428
[45] Oct. 2, 1973

[54] SIMULTANEOUS MEASUREMENT OF THE SIZE DISTRIBUTION OF AEROSOL PARTICLES AND THE NUMBER OF PARTICLES OF EACH SIZE IN A FLOWING GASEOUS MEDIUM

[75] Inventor: Donald H. Preist, Menlo Park, Calif.
[73] Assignee: Varian Associates, Palo Alto, Calif.
[22] Filed: Nov. 26, 1971
[21] Appl. No.: 202,374

[52] U.S. Cl. ............ 324/71 CP, 73/28, 73/432 PS, 235/92 PS, 250/222 M
[51] Int. Cl. ............................................ G01n 27/00
[58] Field of Search ............................ 324/71 PC; 340/237 R, 237 S; 73/432 PS, 28; 235/92 PS; 250/222 M

[56] References Cited
UNITED STATES PATENTS

| | | | |
|---|---|---|---|
| 2,379,158 | 6/1945 | Kalischer | 235/92 PC |
| 3,114,877 | 12/1963 | Dunham | 324/71 PC |
| 3,449,667 | 6/1969 | Gourdine | 324/71 CP |
| 3,679,973 | 7/1972 | Smith, Jr. et al. | 73/28 |

Primary Examiner—Robert J. Corcoran
Attorney—Stanley Z. Cole et al.

[57] ABSTRACT

A method and apparatus are described for measuring the size distribution of aerosol particles in a gas stream and the number of particles of each size. Particle-laden gas flows through the apparatus at a controlled velocity. A group of particles located in a first region are rapidly charged by a pulsed corona discharge. The group of charged particles flows downstream into a second region in which an axial electric field is applied. The mobility of the charged particles through the field is a function of their charge, which in turn is a function of their size, so that the larger particles move through the second region faster and thus in less time than slow particles. In this manner, particles having a common size are concentrated in an axial direction as they move downstream. The magnitude of the charge on particles arriving at the downstream end of the second region is related to the elapsed time between the time of the charging pulse and the moment at which the charge is measured to indicate the particle size distribution and number of particles of each size.

15 Claims, 9 Drawing Figures

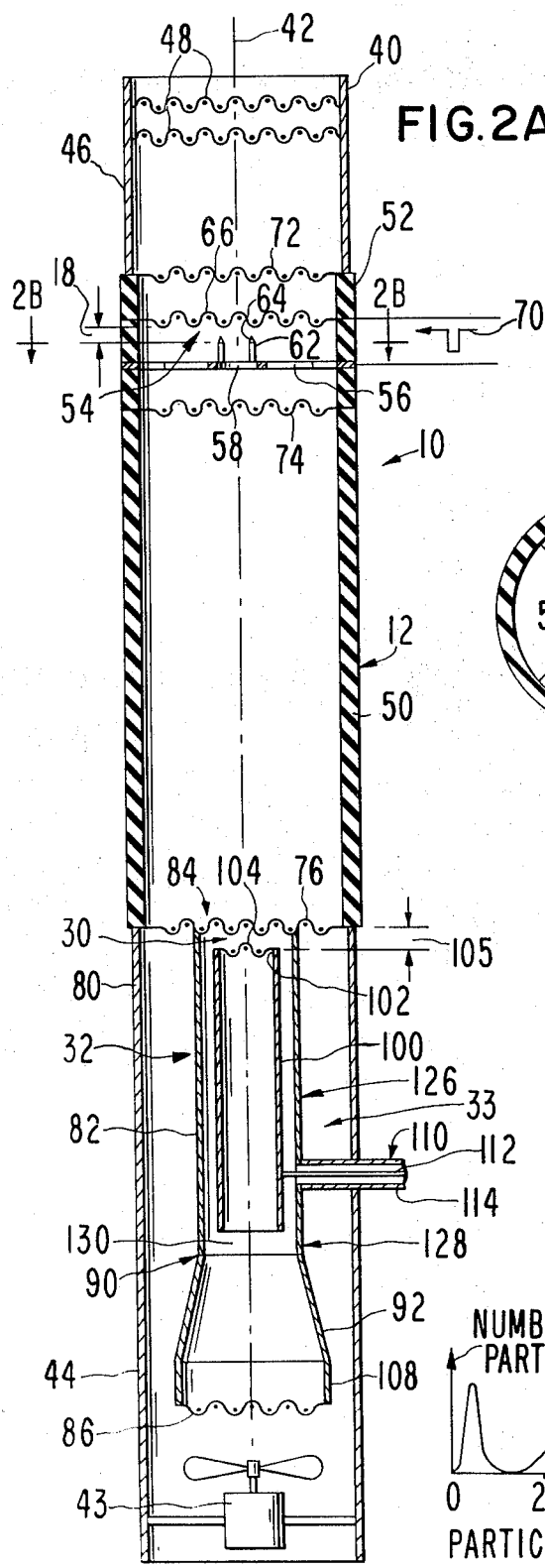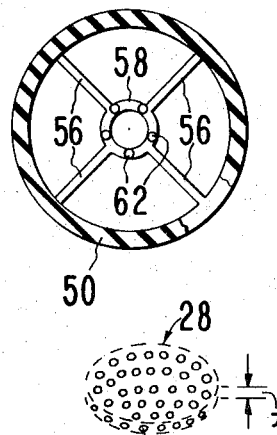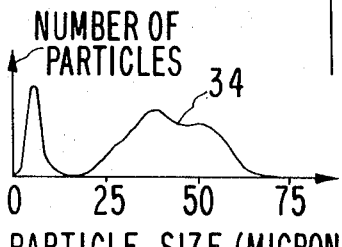

INVENTOR.
DONALD H. PREIST

BY C.E. Martin Jr.
ATTORNEY

SIMULTANEOUS MEASUREMENT OF THE SIZE DISTRIBUTION OF AEROSOL PARTICLES AND THE NUMBER OF PARTICLES OF EACH SIZE IN A FLOWING GASEOUS MEDIUM

BACKGROUND OF THE INVENTION

This application relates to the measurement of air pollution and in particular to the rapid measurement of the quantity and size distribution of aerosol particles.

A need exists for an instrument for monitoring effluents in, for example, stacks of industrial installations such as power plants, smelters, or incinerators, to measure the rate of discharge of all aerosol particles and also the size distribution of the particles. The range of particle size of interest is roughly from 1 to 100 microns in diameter. Present methods for monitoring effluents include filtering, the use of piezo-electric crystals, optical methods, and electrical methods.

In a typical filtering technique, aerosol particles are collected on filter paper during relatively long sampling periods. The particles are then miscroscopically examined. Because a measurement using such technique may require days to complete, it is not suitable for continuous monitoring.

Methods using the piezo-electric characteristic of crystals are able to measure the total concentration of aerosol particles by monitoring the frequency change of an oscillator connected to the crystal as particles of all sizes accumulate on the crystal. Thus, this method is not used to measure particle size distribution, for example.

In one optical method, light is directed through aerosol particle-laden smoke and the attenuation of the light is measured on a detector to indicate total particle concentration. This method does not measure particle size distribution, however. Another optical method uses light scattering to measure particle size by causing the particles to pass one at a time through a chamber so that scattered light amplitude depends on the particle size. The amplitude is measured by a photomultiplier which produces an electrical signal dependent upon particle size. To isolate single particles for detection, gas sampling must be done at low velocity, and the system is usually provided with very narrow pipes which are subject to contamination, require frequent cleaning, and tend to collect the larger particles before their entry into the sensing chamber. Further, such method of measuring the size of a single particle is quite slow, requiring perhaps as much as an hour for a typical measurement.

Electrical methods have the advantage that they can be operated nearly continuously with the results available to the operator after a very short interval of time. In one electrical method described in U.S. Pat. No. 3,114,877 to Dunham, a charging device operates to charge separate groups of aerosol particles passing the device. The particles then flow in a random manner through a field-free region, pass an ion trap and flow to a detector. At the detector, the particles lose their charge and produce a current. Although the detector current in the Dunham apparatus is said to be an index of the number of particles, it is clear that the amplitude of the current is a function of the total charge on all of the particles sensed by the detector at a given moment. Thus, the amplitude of the current is a function of the total surface area of the particles. Because the particles flow in a random manner to the detector, particles having different surface areas (and thus different sizes) lose their charge at the same moment of time to produce the current. Therefore, the output current in the Dunham apparatus is not indicative of the number of particles except when they are of uniform size.

One method which indicates aerosol particle size distribution is based on the mobility of charged particles in an electric field extending radially across a tube in which the particles flow. Mobility is a measure of the velocity of a charged particle in an electric field, and generally speaking, the higher the charge on the particle the higher the mobility. For a given method of charging a particle, the amount of charge on the particle is a function of the size of the particle. Therefore, mobility is a function of particle size and methods based on particle mobility utilize the difference in mobility to measure particle size distribution. In one such device described in U.S. Pat. No. 3,413,545 to Whitby, clean air is caused to move downwardly in an annular flow path surrounding an elongated electrode extending axially in a cylindrical housing. Charged aerosol particles are introduced around the outer periphery of the flow path of clean air and an electric potential is applied across the elongated electrode and the cylindrical housing. For any given potential, particles having a mobility below a certain value will not move radially enough to contact and lose their charge to the elongated electrode before passing its downstream end. An electrometer detects these charged particles which generate a current, the amplitude of which is a function of the total charge on the detected particles. By varying the potential applied to the elongated electrode, more or fewer charged particles will reach the detector and induce the current. By relating the current produced when various potentials are applied to the elongated electrode, a measure of particle size distribution can be obtained. However, a number of factors limit the usefulness of this device for monitoring effluents in stacks of industrial installations, for example. Thus, a supply of clean air must be provided. Also, due to the method of charging, known as diffision charging, only particles less than about 2 microns diameter can be measured whereas in a typical stack, particles up to 100 microns or more will be present. Further, the diffusion charging method is also inconvenient because it requires a source of compressed air and various thin pipes which are subject to clogging.

Accordingly, there is a need for a method and apparatus for measuring particle size distribution based on particle mobility in an electric field which does not require a supply of clean air and does not contain thin pipes. Further, the method and apparatus should permit the measurement of particle sizes up to about 100 microns. In addition, a simpled particle charging apparatus is desired which is not subject to excessive clogging and which requires no external compressors or devices other than a power supply.

SUMMARY OF THE INVENTION

Research has been conducted in an endeavor to measure the size distribution of particles in a gas stream and the number of particles in a given size range. Such research indicates that the limitations of prior methods which relate the mobility of the charged particles in a radial electric field to the particle size distribution may be avoided by periodically charging limited numbers of particles and measuring the time of flight of the charged particles through an axial electric field.

Apparatus for performing the method of the present invention may include a cylinder having a first region provided with a short axial length. Aerosol particle-laden gas is moved at a controlled velocity through the first region of the cylinder. Aerosol particles that are in the first region during a very short period of time are charged so that a small group or bunch of charged particles flows into a second region of the cylinder where the charged particles are subjected to an axial electric field. Each charged particle in the group is drawn axially downstream by the axial field according to the mobility of the particle. Because the mobility of each charged particle is a function of the magnitude of the charge thereon, which is in turn a function of the particle size, the velocity of the charged particle through the second region is a function of its size. The second region has a fixed axial length such that the time of flight for a given charged particle, i.e., the interval of time required for the given particle to move through the second region to a detector, is a function of the size of the given charged particle. As the charged particles that were in the group in the first region advance through the second region the axial field is effective to draw the larger charged particles downstream at a greater rate than the smaller charged particles so that the particles spread out axially and become distributed axially according to size. The number of particles in any axial interval of length within the group depends upon the number of particles of the original group having the corresponding size.

The axially distributed charged particles leave the second region and enter a third downstream region where a detector is located. The detector operates in timed relation to the charging of the particles in the group so that the time at which the detector senses the axially distributed charged particles is indicative of the size of the particles. Also, the detector is responsive to the total charge on the particles detected at any given moment of time. In this manner, an output signal generated by the detector varies with time according to the size distribution of the charged particles and varies in amplitude at a particular moment of time according to the number of particles of each size that were in the original group of charged particles. When the last charged particle of a first group has passed the detector, another group of particles may be charged in the first region, and the process may be repeated continuously.

An object of the present invention is to provide new and improved methods of, and apparatus for, measuring air pollution.

Another object of the present invention resides in a method of and apparatus for rapid measurement of the quantity and size distribution of particles in a gas stream.

A further object of the present invention is to cyclically operate a particle charger to form a series of small groups of charged particles in a gas flow stream and to subject the charged particles of each group to an electric field extending axially along the flow stream so that the charged particles of each group become axially distributed according to particle size.

An additional object of the present invention is to provide a method of performing particle size distribution measurements directly in or adjacent to the stack of an industrial installation by using apparatus having no moving parts, requiring no external air supply and using relatively large cross-section cylinders which minimize clogging.

A still further object of this invention is to provide a particle charging apparatus which yields highly charged particles from a short ionization pulse applied over a short axial distance of a particle flow stream.

Yet another object of the present invention is to obtain and present all the information required to determine the size distribution of particles in a flowstream in a time period of about one second.

A related object of the present invention is to measure the size of particles in the range of about 1 – 100 microns and to do this for particle resistivities of any value found in practice.

BRIEF DESCRIPTION OF THE DRAWINGS

With these and other objects in view, the principles and operation of the present invention may be appreciated and understood when the following description is read in conjunction with the drawings, in which:

FIG. 1 is a schematic view of apparatus for performing the method of the present invention showing aerosol particles and gas flowing into a cylinder;

FIG. 1A is an enlarged view of aerosol particles flowing through the apparatus;

FIG. 2A is a vertical sectional view of the cylinder showing a region for charging groups of the particles, a next downstream region for axially separating charged particles according to size and a third downstream region where the axially separated charged particles are detected;

FIG. 2B is a cross-sectional view taken along lines 2B—2B in FIG. 2A showing a cathode for charging aerosol particles;

FIG. 3A is a graph of an output signal showing the current induced in the detection region by particles having two distinct size ranges vs. the time at which the particles are detected;

FIG. 3B is a graph of an output signal showing the current induced in the detection region by particles having a wide size distribution vs. the time at which the particles are detected;

FIG. 3C is a graph of an output signal produced by the apparatus of the present invention showing the number of particles of each of the various sizes flowing into the cylinder;

DESCRIPTION OF PREFERRED EMBODIMENT

Figure 4:
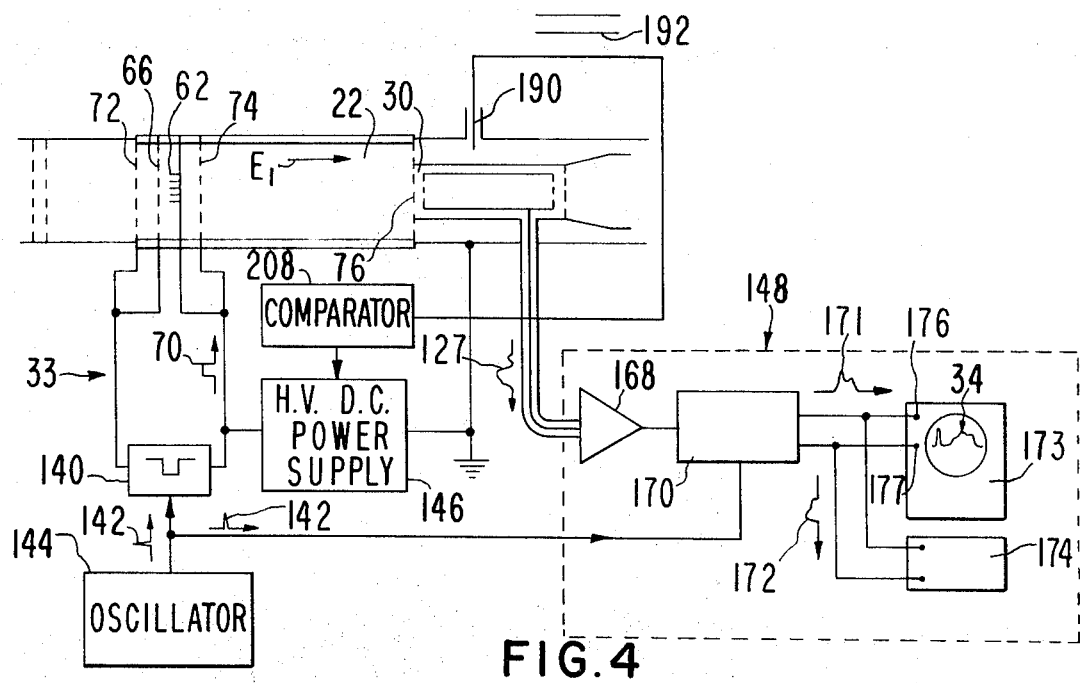
FIG. 4 is a schematic diagram of a detection system for operation in conjunction with the apparatus shown in FIGS. 2A and 2B illustrating an arrangement of circuits for transforming the output signal of FIG. 3B into the output signal of FIG. 3C.

Referring now to FIG. 1 of the drawings, there is shown an apparatus 10 for performing the method of the present invention including a hollow cylinder or tube 12 through which fluid, such as gas, flows at a controlled velocity. Relatively small, solid or liquid particles 14 are suspended in the gas as smoke, fume, dust or powder, for example. Such particles 14 are referred to as aerosol particles and may have a size in the range from less than 1 micron to 100 microns or larger. The aerosol particles 14 move with the gas into the cylinder 12 and are assumed to be well mixed so that the various sizes of particles are randomly distributed in the gas.

The aerosol particles 14 that are located in a first or charging region 16 of the cylinder 12 during a given time period $t_1-t_0$ (FIG. 3A) are rapidly charged. The axial length 18 of the first region 16 is relatively short and the charging time period ($t_1-t_0$) is very short so that only a small group or bunch 20 of the particles 14 is charged and flows downstream into a second region 22 of the cylinder 12 where the charged particles are subjected to an axial electric field $E_1$. The second region 22 has a fixed, relatively long axial length 26 in comparison to the length 18 of the first region 16. As the charged particles 14 of the group 20 advance through the second region 22, the axial field $E_1$ is effective over the length 26 to cause the larger particles 14 to move forward at a greater rate than the smaller particles 14 so that the particles spread out axially and form an axially elongated or extended group with the particles distributed axially according to size. Thus, the interval of time or time of flight, such as $t_2-t_0$ (FIG. 3A), required for a given particle 14 to move through the second region into a third or charge detection region 30 is a function of the size of the charged particle.

The progressive sorting or axial distribution of the charged particles as they move downstream through the second region 22 is illustrated in FIG. 1. The group of particles shown as 20 which has just emerged from the first region 16 is well mixed. As the group progresses downstream, the axial distribution of the particles according to size occurs. At 20a, partially complete distribution is indicated. At 20b, completed size distribution is shown. By this time, the axial length of the original group 20 has increased or extended to form the axially elongated group having the particles distributed axially according to size. To illustrate the effect of such axial size distribution, reference is made to a volume 28 (FIG. 1A) including a portion of the elongated group 20b, wherein the volume is defined by a short axial interval of length 31 and a cross-section taken perpendicular to the axis 42 through the elongated group 20b at the opposite ends of such length 31. Because of the axial distribution, the range of particle size of the particles in any given one of such volumes is limited. If the interval of length 31 is very short, charged particles within a very small size range will be in the volume 28.

A detection system 33 including a detector 32 located in the third region 30 operates in timed relation to the charging of the particles in the group 20 so that the moment of time at which the detector 32 senses the arrival of the charged particles 14 in the axial interval of length 31 is indicative of the size of such particles 14. Also, the detector 32 is responsive to the total charge of the particles in each such given axial length 31 such that an output signal 34 from the apparatus 10 varies with time according to the size distribution of the charged particles and varies in amplitude according to the number of particles of such size that were in the original group 20 of charged particles. When the last charged particle 14 of the first group 20 has passed the detector 32, another group 20 of particles is charged in the first region 16 and the method of the invention is repeated.

Referring now in detail to FIG. 2A, the apparatus 10 is shown in detail including the hollow cylinder 12 provided with an inlet end 40 for continuously receiving the gas and the aerosol particles 14 from a stack or other source of particle-laden gas (not shown). The particle-laden gas may be drawn into the inlet end 40 and fows at a relatively constant velocity in the direction of the axis 42 of the cylinder 12 and through the cylinder upon operation of a blower 43 connected to an outlet end 44 of the cylinder, for example.

The inlet end 40 is shown fabricated from a tube 46 of metallic material and carries one or more screens 48—48 mounted perpendicular to the axis 42 for reducing aerodynamic tubulence of the flow of gas in the cylinder 12.

Downstream from the inlet end 40, the cylinder 12 is formed from a tube 50 of ceramic or other electrically insulating material. At the upstream end 52 of the tube 50, a device 54 is mounted for applying an electrical charge to the groups 20 of particles 14 according to the "field charging" mechanism. To provide a high density of ionized gas and a strong electric field in the first region for field charging, the charging device includes a number of radially extending, electrically conductive members 56—56 extending from the tube 50 to a ring 58 which surrounds and is concentric with the axis 42. One or more point cathodes 62 are mounted on the ring 58 with the pointed ends 64 thereof preferably directed upstream and extending parallel to the axis 42 of the cylinder 12. A perforated anode, such as a screen 66, is mounted transversely across the tube 50 upstream from the pointed ends 64 of the cathodes 62. Circuitry of the system 33 (shown in FIG. 4) is effective to apply a short, substantially square voltage pulse 70 across the anode 66 and the cathode 62. The pulse 70 may, for example, have an amplitude of 5KV and a duration $t_1-t_0$ (FIG. 3A) of 1 millisecond.

During the voltage pulse 70, a corona discharge is established to ionize the gas and provide high ion density in the presence of the electric field between the anode 66 and the cathode 12. Under these conditions, any of the aerosol particles 14 that are between the anode 66 and the cathode 62 during the voltage pulse 70, receive an electrical charge. To trap any gas ions that are not used in charging the aerosol particles 14 and to further reduce the turbulence of the gas, a screen 72 is provided upstream from the charging device 54 at anode, cathode or other suitable potential and a screen 74 is mounted downstream from the charging device preferably at cathode potential.

A mathematical description of field charging may be found, for example, in "Industrial Electrostatic Precipitation," by H. J. White (Addison-Wesley, 1963) Chapter 5, pp. 126-150. In particular, it can be shown that a spherical, electrically conductive particle in the presence of a dense cloud of gas ions and an electric field will ultimately reach a limit of charge (saturation charge) which varies as the square of the diameter of the particle. In particular, the saturation charge is given by the equation:

$$n_s e = 3 E_o a^2 \tag{1}$$

where: $E_o$ is electric field,
$a$ is particle diameter,
$e$ is the charge on one electron, and $n_s$ is the number of electron charges.

For a 1 micron diameter particle, an ion density of $5 \times 10^8$ ions per cm³, and a field of 10 KV per cm, the saturation charge amounts (numerically) to about 600 electron charges. Furthermore, this charge is acquired very rapidly. For the above ion density, for example, about one-fourth of the saturation charge, or 150 electronic charges, is acquired in 1 millisecond.

The group 20 is formed by the aerosol particles 14 that were charged during the time period $t_1-t_o$ of the voltage pulse 70. The axial length 18 of the group 20 of particles 14 is dependent upon the time period of the voltage pulse 70, the axial velocity of the aerosol particles through the tube 12, and the axial distance between the cathode 64 and the anode 66.

The group 20 of charged aerosol particles 14 flows with the gas into the second region 22 which is located in the tube 50 between the screen 74 and a screen 76 which extends across the tube 50 and is spaced axially downstream from the screen 74. The screens 74 and 76 are spaced apart by the axial distance 26 which is long relative to the short axial length 18 of the first region 16. A high, preferably constant, voltage of 40 KV, for example, is applied across the screens 74 and 76 to establish the axial electric field $E_1$ in the second region 22.

The charged particles 14 interact with the axial electric field $E_1$ and receive an axial velocity increment in excess of the relatively constant axial gas velocity. The axial velocity increment may be stated, to a first approximation, by the following equation:

$$V_e = E_o E_1 a/2 \pi \eta (1 + A \lambda/a) \text{ tm} \quad (2)$$

where: $V_e$ is the velocity increment, $E_o$ is the electric field in the first region, $E_1$ is the electric field in the second region 22, $\eta$ is the gas viscosity, $A$ is a constant equal to about 0,86 at NTP, and $\lambda$ is the molecular mean free path, typically about 0.1 micron, and $a$ is the aerosol particle diameter.

If all terms on the right hand side of Equation (2) are time invariant, then the velocity will be uniquely determined by the aerosol particle diameter $a$. It is therefore essential that the electric fields $E_o$ and $E_1$ be constant. As described more fully below, $E_1$ is established by a d.c. power supply and $E_o$ by a pulse generator which generates square pulses having minimal rise and fall time and constant amplitude. In greater detail, if the electric field $E_o$ in the first region varies with respect to time, such as sinusoidally, then as particles having the same size enter and flow through the first region during the application of the sine pulse, the effective electric field, hence the amount of charge received by each particle, will not be the same for all particles even though the particles are all the same size. Thus, those particles that are not subject to the maximum field $E_o$ in the first region will be charged less and will appear (from a charge standpoint) to be smaller in size.

Equation (2) expresses numerically the "mobility" of the particles referred to above and shows that the incremental (or electrical) velocity imparted to a given charge particle 14 by the electric field $E_1$ in the second region 22 is directly proportional to the field strength. It may also be appreciated from Equation (2), that for aerosol particles 14 larger than about 1 micron, there is a substantially linear relationship between the aerosol particle velocity increment $V_e$ and the particle diameter. Therefore, the larger charged particles 14 of the group 20 will advance through the second region 22 in less time than the smaller charged particles. In this manner, assuming the group 20 includes charged particles 14 having various sizes, the axial length of the group 20 increases as the larger charged particles move faster than the smaller charged particles. As a result, by the time the group **20*b* of charged particles 14 reaches the downstream end of the tube, the charged particles 14 will be distributed axially according to size as shown in FIG. 1.**

The axially moving group **20*b* of charged particles 14 advances through the screen 76 into the third region 30 of the cylinder 12 where the detector 32 is located. Still referring to FIG. 2A, the detector 32 is shown mounted in a metallic section 80 of the cylinder 12. The section 80 is attached to the downstream end of the ceramic tube 50 at the juncture of the screen 76 and the tube 50. A second hollow metallic cylinder 82 is mounted coaxially in the section 80 with an entrance or first end 84 connected electrically and mechanically to the screen so that the cylinder 82 is at the screen potential. A flared extension 92 is secured to an end 90 of the cylinder 82 so that the gas velocity at the axis 42 of the second cylinder 82 is about the same as the gas velocity at the axis 42 of the cylinder 50, even though screens 76, 104 and 86 resist the gas flow. In this manner, turbulence is minimized at the entrance 84 to the second cylinder 82** such that disturbance of the axial distribution of the charged particles is minimized.

The detector 32 further includes a detector element in the form of a third hollow, metallic cylinder 100 mounted coaxially within the second cylinder 82 in electrically insulated relationship thereto. An upstream end 102 of the third cylinder 100 is spaced downstream from the screen 76 to define the charge detection region 30 between the screen 76 and a grid such as a screen 104, mounted across the end 102 of the third cylinder 100. To render the detector 32 responsive to charged particles 14 having as limited a size range as possible, the axial length 105 of the third region 30 is selected so as to be short relative to the axial length 18 of the group 20 of charged particles 14, and in practice as short as possible, because degradation of the particle size resolution will occur, proportionally to this axial length.

Another grid, such as a screen 86 is mounted across the downstrean end 108 of the flared extension 92. The screens 76 and 86 provide thorough electrostatic shielding of the detector element 100 from extraneous electric fields which would otherwise cause noise, interfering with signals from the charged particles 14. A coaxial cable 110 having an inner conductor 112 connected to the detector element 100 and an outer conductor 114 connected to the second cylinder 82 extends through the cylinder 12 to the circuits shown in FIG. 4.

Referring now to FIGS. 1 and 2A, it may be recalled that when the group **20*b* of charged particles 14 advances from the second region 22 through the screen 76 into the third region 30, the charged particles are axially spread out according to the size distribution of the particles in the group 20*b*. The extended group 20b of charged particles 14 advances axially through the screen 76 into the third axially short region 30** and induces a first current 120 (FIG. 3B) in a circuit 126 including the outer conductor 114, the second cylinder 82, the screen 76, the screen 104, the third cylinder 100 and the inner conductor 112. The first current 120 appears in the coaxial cable 110 in the form of an output signal 127. The amplitude of the induced first current 120 at any instant of time ($t$) is proportional to the total charge of the charged particles 14 in the axial interval of length 31 that are received in the third region 30 at any such instant of time, according to the following equation:

$$i_{(t)} = Kq_{(t)} \cdot v \qquad (3)$$

where: $i_{(t)}$ is current at time $t$, $K$ is a constant, $q_{(t)}$ is total charge at time $t$, and $v$ is the gas velocity.

It may be appreciated, therefore, that the amplitude of the first current 120 in the circuit 126 and thus the amplitude of the output signal 127 will vary according to the total charge of the charged particles in any of the axial intervals of length 31 within the group 20$b$. Further, as indicated by Equation 2, the time at which a particular axial interval of length 31 of the charged particles 14 induces the first current 120 in the circuit 126 is related to the size of the particles in such length 31. Accordingly, both the amplitude and the time of a peak in the output signal 127 are significant.

A given extended group 20$b$ of charged particles 14 advances through the third region 30 and moves through the third cylinder 100 to the end 106.

As such extended group 20$b$ exits from the third cylinder 100 and enters a space 130 between the end 106 and the cylinder 82, a second current 132 opposite in direction with respect to the direction of the first current 120 in the circuit 126 is induced in a second circuit 128 including the inner conductor 112, the third cylinder 100, the second cylinder 82, and the outer conductor 114. To avoid inducing such opposite current 132 at the same time that an ustream or later axial increment of length 31 of the charged particles of the elongated group 20$b$ induces the first current 120 by passing through the third region 30, the second and third cylinders 82 and 100, respectively, have an axial length that is great enough to permit all of the particles in the extended group 20$b$ to pass through the third region 30 before the downstream particles in said extended group 20$b$ exit from the third cylinder 100. The actual length of the second and third cylinders in a given embodiment of the detector 32 may, for example, be somewhat greater than the axial length of the cylinder 50.

Referring now to FIG. 4, the system 33 is further shown including a generator 140 for producing the substantially square, high voltage pulses 70 in response to a timing signal 142 from a free-running oscillator 144. In greater detail, and referring now to FIG. 3A, at time $t_o$, the timing signal 142 is applied to the generator 140 so that the square voltage pulse 70 is generated during the time period $t_1-t_o$. The square voltage pulse 70 is applied across the anode 66 and the cathode 62 to establish the corona discharge in the first region 16 between the cathode 62 and the anode 66 during the time period $t_1-t_o$. Those aerosol particles 14 that flow in the first region 16 during the time period $t_1-t_o$ become charged and from the group 20 of charged particles 14.

Still referring to FIG. 4, a high voltage d.c. power supply 146 is shown connected across the screens 74 and 76 to establish the axial electric field $E_1$ in the ssecond region 22 so that the charged particles 14 become axially distributed according to size.

The timing signal 142 is also applied to an amplifier and signal processing unit 148 of the system 33 to condition the unit for reception of the output signal 127 from the detector 32 via the cable 110. The unit 148 utilizes the timing signal 142 to establish a time reference from which to measure the time of flight or time lapse, such as $t_2-t_o$ (FIG. 3A), required for the charged particles 14 in successive lengths 31 of the elongated group 20$b$ to advance from the first region 16 to the third region 30. The unit 148 generates the signal 34 which is indicative of the particle size distribution of the group 20$b$ and the number of particles of each size. In particular, when the output signal 34 has a peak at a given time lapse, such as $t_2-t_o$ (FIG. 3A), the size of the particles 14 detected in the length 31 and resulting in the peak is known and may be indicated on a screen 150 of a display 15 such as a cathode ray tube or recorded by a recorder 152. In addition, the amplitude of a peak in the output signal 34 is indicative of the number of particles 14 resulting in such peak.

Examples of typical particle size distributions which may be measured by the apparatus 10 are shown in FIGS. 3A and 3B. In FIG. 3A, the output signal 127 from the detector 32 is shown for particles 14 in two narrow size ranges. The particles 14 arrive at the detection region 30 in separate increments of length 31$a$ and 31$b$ and at respective times $t_2$ and $t_3$. Detection of the particles in the lengths 31$a$ and 31$b$ in the region 30 results in peaks 160 and 162 of the output signal 127. When the particles exit from the end 106 of the tube 100, peaks 164 and 166 having an opposite polarity from the peaks 160 and 162 are produced.

In another situation, the particles 14 may have a wide range of sizes and the resulting signal 127 would appear as shown in FIG. 3B. There, the signal 127 has an amplitude at times other than $t_2$ and $t_3$ indicating that the range of particle sizes is wider than that resulting in the signal 127 shown in FIG. 3A.

Directing attention again to FIG. 4, the unit 148 is shown including an amplifier 168 for increasing the amplitude of only the first current 120 of the output signal 127 and blocking the second current 132. The amplified portion of the signal 127 is applied to a signal processing unit 170 which generates a pair of voltage signals 171 and 172 for operation of a display unit 173 and an X-Y recorder 174. The voltage signal 171 is derived from the signal 127 and varies with time in proportion to the number of particles 14 of a given size the group 20, whereas the signal 172 varies with time in proportion to particle size. The voltages 171 and 172 may, for example, be presented orthogonally on a cathode ray tube of the display unit 173 and on the X-Y recorder 174 such that each presents the signal 34 which is representative of particle number vs. particle size in Cartesian coordinates.

In particular, the unit 170 processes the signal 127 to produce the signal 171. The processing utilizes two separate and independent non-linear relationships. The first is the relationship between the instantaneous value $i_{(t)}$ of the inducted first current 120 and the number $N_{a(t)}$ of particles 14 that induced the first current 120 at time $t$. In greater detail, from Equation 3 it is seen that the instantaneous value $i_{(t)}$ of the first current 120 is proportional to the total charge $q_{(t)}$ or:

$$i_{(t)} \propto q_{(t)} \quad (5)$$

Noting that $q_{(t)}$ is the charge $q_{(a)}$ on one particle of a given diameter a times the number $N_{a(t)}$ of particles of such given size in the region 30 at time $t$, $i_{(t)}$ can also be expressed as:

$$i_{(t)} \propto q_{(a)} N_{a(t)} \quad (6)$$

From Equation 1, it is seen that the charge $q_{(a)}$ on one particle is proportional to the particle diameter a squared, or $$q_{(a)} \propto a^2 \quad (7)$$

Combining Equations (6) and (7), it is seen that:

$$i_{(t)} \propto N_{a(t)} a^2 \quad (8)$$

Examining Equation 8, it may be appreciated that if the particle size a arriving at the region 30 at time $t$ is known, the number of particles $N_{a(t)}$ arriving at the region 30 at time $t$ can be determined from the instantaneous value $i_{(t)}$ of the current 120 at time $t$.

Figure 5:
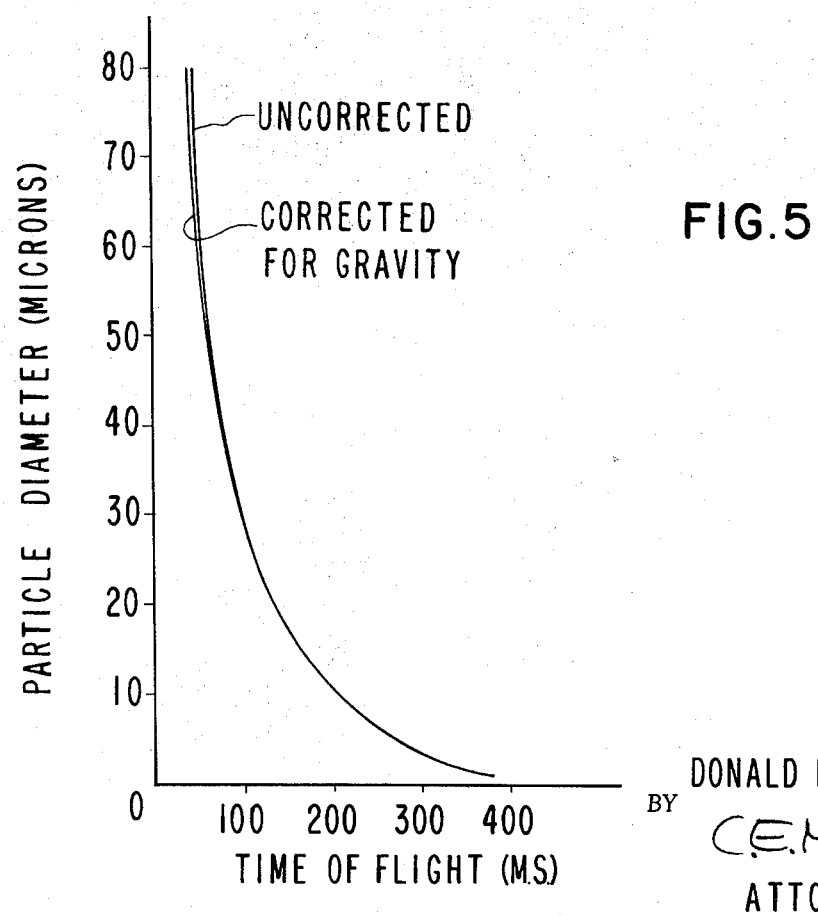
FIG. 5 is a graph of charged particle diameter vs. the time of flight of the charged particles from the first region to the third region showing small particles to have longer times of flight than larger particles.

The size a of the particles arriving at time $t$ is known as a result of calibration of the apparatus 10 by flowing various known sizes of aerosol particles through the tube 12 and measuring the time required for the flight of each known size particle from the first region 16 to the third region 30. The data resulting from such calibration may be reduced to graphical form, as shown in FIG. 5, for example. There, the theoretical time of flight of charged particles 14 is plotted against the diameter of the particles 14 for the following conditions:

Electric field in ionizing region due to pulse 70 = 5KV/cm.
Electric field in second region 22 between screens 74 and 76 = 4KV/cm.
axial gas velocity = 50 cm./sec.
axial length between screens 74 and 76 = 20 cm.
gas temperature = 20° C.

The calibration data may also be expressed algebraically in functional form as:

$$a = f_1(t), \quad (9)$$

The calibration data may be stored in a memory unit (not shown) so that upon interrogation by a signal indicative of a given instant of time, a signal indicative of particle size corresponding to the instant of time will be produced.

Combining Equations (8) and (9), it may be appreciated that the number of particles $N_{a(t)}$ arriving at the region 30 at the time instant $t$ is proportional to the instantaneous current $i_{(t)}$ at time $t$ divided by the square of $f_1(t)$, and may be expressed algebraically as:

$$N_{a(t)} \propto i_{(t)}/f_1^2(t) \quad (10)$$

In practice, the term $f_1^2(t)$ is obtained electronically from a function generator (not shown) in the form of a voltage which varies with time. In response to the timing pulse 142, the unit 170 divides this voltage into another voltage which is directly proportional to the current 120, which also varies with time. Signal 171 results from such division and appears as a voltage varying with time. The signal 171 is linearly amplified and applied to a vertical input 176 of the display unit 173.

The voltage applied to a horizontal input 177 of the display unit 174 may be, for example, a voltage varying linearly with time. In this case, the resulting output of the display unit 173 will have a Y or ordinate value linearly proportional to particle number, and an X or abscissa value which is not linear with respect to particle size. The face of the display unit 173 is equipped with a calibrated overlay indicating how the abscissa corresponds to particle size.

If it is desired to present the signal 34 on the face of the display unit 173 so that the X value will be linear with respect to particle size, as shown in FIG. 3C, the voltage 172 applied to the horizontal input 177 may be derived from a function generator (not shown). In this case, the function generator produces a voltage varying with time according to the data presented in FIG. 5, for example.

The signal 34 thus indicates the number of particles 14 of a given size that were in the original group 20 of charged particles. If it is desired to indicate the number of particles of a given size $N_a$ that are in a given volume of the gas that is sampled during operation of the apparatus 10, then the number of particles $N_a$ is divided by the volume of the group 20.

If it is desired to determine the size distribution and number of particles of each size when the particles or the gas is initially in a charged condition, devices well known in the art may be used to discharge the gas and particles before they enter the cylinder 12. In this manner, the only charged particles that enter the second region 22 will be those that are selectively charged in the first region 16 according to the principles of the present invention.

As shown in Equation (2), the mobility of the charged particles in the axial electric field 24 depends on viscosity, which in turn depends on the temperature of the gas. Therefore, a thermocouple 190 may be inserted in the cylinder 12 as shown in FIG. 4 to provide a temperature compensation signal 192 which varies according to variations in the gas temperature. A comparator 208 determines the difference between the signal 192 and a reference signal and regulates the d.c. power supply 146 so that the voltage between the screens 74 and 76 is varied to offset the effect of the temperature change.

As an example of apparatus constructed according to the principles of the present invention, the apparatus 10 may be constructed according to the specifications set forth below in Table I and operated according to the conditions listed in Table II below.

TABLE I

| | |
|---|---|
| Distance between cathode 82 and anode 66 | 5 mm. |
| Diameter of ring 50 | 12 mm. |
| Length of second region 22 | 20 cm. |
| Axial length 105 of third region 30 | 1 mm. |
| Diameter of cylinder 82 | 10 cm. |
| Diameter of cylinder 100 | 25 mm. |

TABLE II

| | |
|---|---|
| Mean gas velocity in cylinder 12 | 50 cm/sec. |
| Voltage across screens 74 and 76 | 40 KV. |
| Voltage of charging pulse 70 | 5 KV. |
| Charging time period (duration of pulse 70) | 1 ms. |

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Apparatus for simultaneously measuring the concentration and size distribution of aerosol particles in a flowing gaseous medium, comprising:

means for causing at least a portion of said gaseous medium to flow through a cylindrical structure in a given direction parallel to the axis thereof;

means for generating a timed electrical pulse having a substantially constant voltage throughout its duration, said pulse duration being short in comparison with the time required for said portion of said gaseous medium to flow through said cylindrical structure;

means responsive to said pulse for electrically charging a group of said particles in a first region, the axial length of said group in said given direction being short in comparison with the axial length of said cylindrical structure;

means for measuring the magnitude of the electric charge on said particles as a function of time elapsed from the charging of said particles; and means effective upstream from said measuring means for subjecting said group of charged particles to an electric field in a second region extending in said given direction for a length that is long in comparison with the axial length of said group of charged particles, said electric field being effective to accelerate said charged particles positively in said given direction, so that said elapsed time for a given charged particle is a function of the magnitude of the charge on said particle.

2. Apparatus according to claim 1, wherein:

said means for electrically charging a group of said particles includes means for establishing a high ion density and a strong electric field simultaneously in said first region of said cylindrical structure upstream from said second region.

3. Apparatus according to claim 2, wherein:

the quantity of electric charge imparted to any particle of said group depends upon the size of said particle so that the time of arrival of said particle at said measuring means depends upon the size of said particle.

4. Apparatus according to claim 3, wherein:

said measuring means includes a device for detecting the total charge on the particles within a particular incremental size range which arrive at said measuring means within an incremental time interval which corresponds with said incremental size range to produce a signal, said measuring means further being responsive to said timed electrical pulse to provide a time reference for said signal for generating a display indicative of the size distribution of the particles in each group and the number of particles of each size.

5. Apparatus for monitoring a flow stream including fluid and particles in said stream to determine the size distribution of said particles and the number of particles of each size, comprising:

means for generating an electrical timing pulse, said pulse having a substantially constant voltage throughout its time interval;

field charging means responsive to said pulse for electrically charging that portion of said particles located in a first region of said fluid flow stream during said pulse, said first region having a first axial length;

means for establishing an axial electric field in a second region extending axially for a second length along said flow stream downstream from said first region, said electric field being effective to accelerate said charged particles positively in the downstream axial direction to separate said charged particles in said axial direction according to the magnitude of the charge thereon so that larger charged particles will traverse said second region in shorter time than smaller charged particles, said second length being long relative to said first length; and means responsive to said timing pulse for detecting the times of traverse of said charged particles of various sizes through said second region and for detecting the total charge on those particles of a given incremental size range which traverse said second region in a given time, said detecting means generating an output signal varying in amplitude and time so that at any given time the signal amplitude depends on the number of particles of a given size and the time of said amplitude depends on the magnitude of said given size.

6. Apparatus according to claim 5, wherein:

said establishing means includes an electrode located at each end of said second region and means for applying a selected voltage across said electrodes; and said output signal generating means includes first and second coaxial, electrically conductive cylinders mounted in said flow stream downstream from said second region, said first cylinder surrounding said second cylinder and having an upstream end connected to the electrode located at the downstream end of said second region, said second cylinder having an upstream end spaced down stream from said downstream electrode to form a third region, said axially separated charged particles being effective in said third region to induce in said coaxial cylinders a current varying with respect to time according to the size of the particles and having an amplitude at any particular time according to the total charge density of the charged particles in said third region of said particular time.

7. Apparatus for simultaneously determining the size distribution of aerosol particles and the number of aerosol particles of each size in a gas stream, which comprises:

means for defining a flow path for said gas stream and said particles, said flow path having first, second and third regions arranged in seriatim along a longitudinal axis of said flow path, said second region being between said first and third regions and having an axial length substantially exceeding that of each of said first and third regions;

means for moving said gas stream and said particles into said first region at a controlled velocity and for moving said gas stream through said second and third regions at said controlled velocity;

means for generating a series of electrical timing pulses, each pulse having substantially constant voltage throughout its duration;

means responsive to each of said timing pulses for electrically charging only a specific group of particles that are in said first region during a given interval of time commencing with each of said timing pulses, said groups being axially spaced along said flow path;

a pair of spaced electrodes, a first of said electrodes being mounted at the upstream end of said second region and a second of said electrodes being mounted at the downstream end of said second region;

means connected to said pair of electrodes for establishing an electric field axially across said second region, said axial electric field being effective to increase the axial velocity of the charged particles in each said group relative to said controlled velocity according to the amount of electrical charge on said charged particles so that as said axially spaced groups of charged particles move axially through said second region those of said charged particles of a given group having different sizes become separated axially according to size and particles of the same size become axially concentrated;

means responsive to the total charge on said axially concentrated particles of a given group advancing through said third zone for generating an output signal for each said group, said output signal varying with time according to the size distribution of the charged particles in each group and having an amplitude representing the number of particles of each size in said size distribution of said group; and means responsive to said output signal and said timing pulse for indicating the size distribution of the particles in each said group and the number of particles of each size in said size distribution.

8. Apparatus according to claim 5, further comprising:

means located upstream and downstream from said field charging means for reducing the turbulence in said fluid flow stream.

9. Apparatus according to claim 6, wherein:

said second cylinder is provided with an axial length selected so that all of the particles charged during said timing pulse enter and remain in said second cylinder until the last of said charged particles enters said second cylinder.

10. Apparatus according to claim 1, which further comprises:

means responsive to the temperature of said gas stream for generating a temperature control signal; and means responsive to said temperature control signal for varying the strength of said axial electric field to compensate for changes in the temperature of said gas stream.

11. Apparatus for monitoring the size distribution of particles in a fluid medium and indicating the relative number of particles of each size, comprising:

a first tube having an inlet end and an outlet end to permit said fluid medium to flow at a relatively constant velocity through said tube;

means for generating a series of timed electrical pulses, each pulse having a substantially constant voltage throughout its duration, said pulse duration being short in comparison with the time required for said fluid medium to flow through said tube;

field charging means received in said inlet end of said first tube, said field charging means being responsive to said constant voltage pulses for cyclically electrically charging the particles received in a relatively short axial length of said first tube;

a pair of grids mounted across said first tube between said inlet end and said outlet end thereof downstream from said field charging means, said grids being spaced by an axial distance that is substantial as compared to said short axial length;

means for applying across said grids an electric potential to produce an electric field extending axially in said tube, said field being effective to axially separate the charged particles according to the magnitude of the charges on the particles;

a second tube mounted coaxially in said first tube and having an upstream inlet end secured to said downstream grid for receiving said axially separated charge particles; and a third tube mounted coaxially in said second tube and having an upstream inlet end located downstream from said downstream grid to form an interaction region, said third tube having a screen mounted across said inlet end so that said axially separated charged particles flowing through said interaction region induce a current in said screen and said third tube, said current having an amplitude in proportion to the magnitude of the total charge on the particles in the interaction region at any moment of time and being variable with respect to time according to the size of the particles.

12. Apparatus for simultaneously measuring the concentration and size distribution of aerosol particles in a flowing gaseous medium, comprising:

means for moving said gaseous medium at a controlled flow velocity through successive first, second and third separate regions serially arranged along a given direction of movement;

means for generating a timed electrical pulse having a substantially constant voltage throughout its duration, said pulse duration being short in comparison with the time required for said medium to flow through said first, second and third regions;

means responsive to said pulse for electrically charging those of said particles which are moving through said first region during a given time interval;

means for applying an electric field to said charged particles in said given direction within said second region, said electric field being effective to accelerate said charged particles positively in said given direction; and means responsive to the magnitude of the total electric charge on those of said charged particles moving through said third region at successive times elapsed from said given time interval for generating a signal varying with time according to the size distribution of said aerosol particles.

13. A method of measuring the size distribution of aerosol particles in a gas, comprising the steps of:

moving said gas and particles in a selected flow path and at a controlled velocity through first, second and third regions spaced in seriatim axially along said flow path, said first and third regions being axially short relative to the axial length of said second region;

generating a timed electrical pulse having a substantially constant voltage throughout its duration, said pulse duration being short in comparison with the time required for said gas to move through said first, second and third regions;

electrically charging those of said particles that are moving through said first region during a time period determined by said pulse to produce a group of charged particles moving axially into said second region;

establishing an electric field axially along said flow path to axially separate the charged particles in said group according to size; and measuring the elapsed time between the start of said time period and the time at which the various axially separated charged particles enter said third region to indicate the size distribution of the aerosol particles.

14. A method of measuring the particle size distribution and the number of particles of each size in a gas, comprising the steps of:

directing the gas and the particles along a flow path at a controlled velocity;

generating a timed electrical pulse having a substantially constant voltage throughout its duration, said pulse duration being short in comparison with the time required for said gas to traverse said flow path;

during a short time interval determined by said pulse electrically charging the particles moving through a short axial length of said flow path;

subjecting said charged particles to an electric field extending axially along said flow path for a given distance to vary the elapsed time between said time interval and the time at which charged particles having different sizes pass a given location spaced downstream from said electric field, said given distance being substantially longer than said short axial distance;

measuring said elapsed times for said charged particles to indicate the size distribution of said particles; and measuring the total charge of said charged particles at said given location for each said elapsed time to indicate the number of particles of each size in said size distribution.

15. Apparatus for measuring the concentration and size distribution of aerosol particles in a gas stream flowing in a given axial direction, comprising:

pulsed means effective during a given time interval for electrically charging a group of said particles, said group having a short length in said given direction;

means for measuring the magnitude of the electric charge on said particles as a function of time elapsed from said given time interval;

means effective upstream from said measuring means for subjecting said group of charged particles to an electric field extending for a relatively long length in said given direction so that said elapsed time for a given charged particle is a function of the magnitude of the charge on said particle;

means responsive to the temperature of said gas stream for generating a temperature control signal; and means responsive to said temperature control signal for varying the strength of said axial electric field to compensate for changes in the temperature of said gas stream.

* * * * *